United States Patent [19]

Liepse

[11] Patent Number: 4,805,889
[45] Date of Patent: Feb. 21, 1989

[54] CHAIN-KEEPER

[76] Inventor: Robert K. Liepse, P.O. Box 218, Mexico, Mo. 65265

[21] Appl. No.: 118,270

[22] Filed: Nov. 9, 1987

[51] Int. Cl.$^4$ ............................................. B25B 1/02
[52] U.S. Cl. ............................ 269/210; 269/254 CS; 269/902; 269/268; 242/47.5
[58] Field of Search ............... 59/93; 69/1.5; 30/380; 242/47.5; 269/254 R, 254 CS, 210, 256, 902, 268; 76/25 A

[56] References Cited

U.S. PATENT DOCUMENTS

| 321,812 | 7/1885 | Harding | 269/210 |
| 1,219,026 | 3/1917 | Morris | 69/1.5 |
| 2,541,080 | 2/1951 | Lyon | 69/1.5 |
| 3,088,729 | 5/1963 | Marcus | 269/254 CS |

FOREIGN PATENT DOCUMENTS 1443185  5/1966  France .............................. 269/210

OTHER PUBLICATIONS

K-D Tools, Automotive Catalog No. 74, 1973, p. 25.

Primary Examiner—David Jones

[57] ABSTRACT

An adjustable device is provided that may be locked into a fixed position at any point throughout the adjustment length to carry and store a variety of sizes of chain saw cutting chains in an orderly fashion.

3 Claims, 1 Drawing Sheet

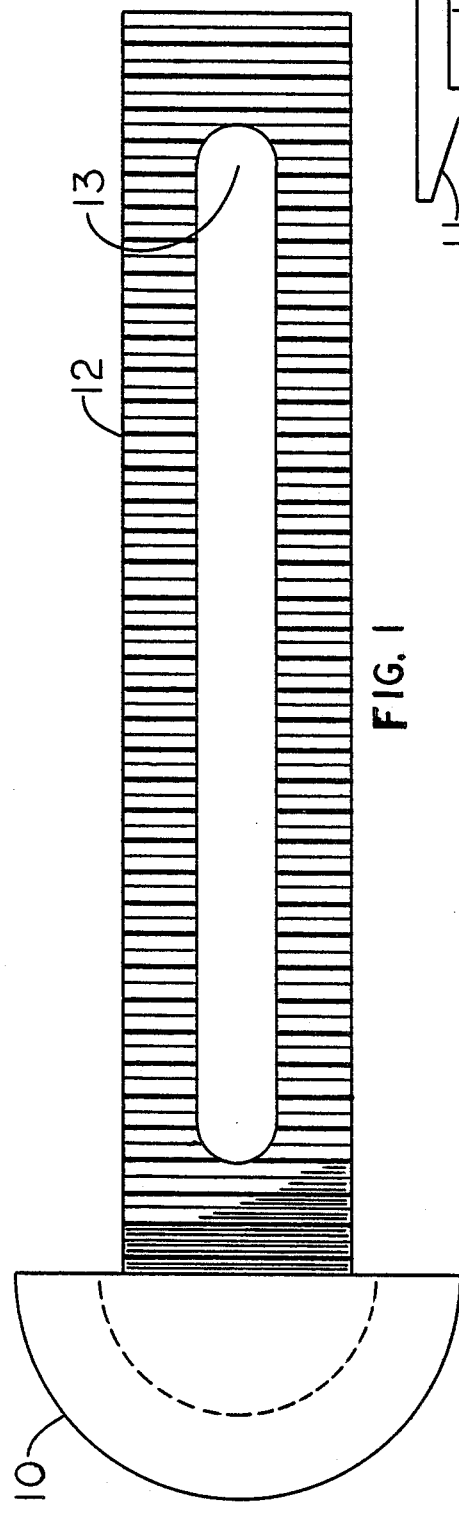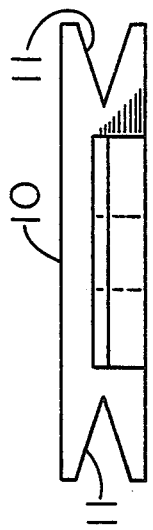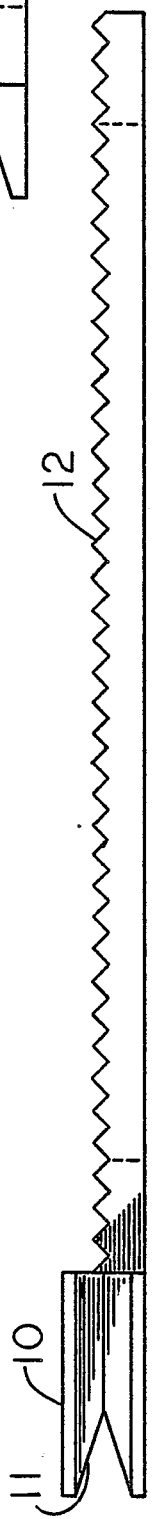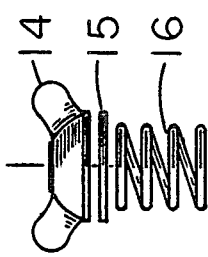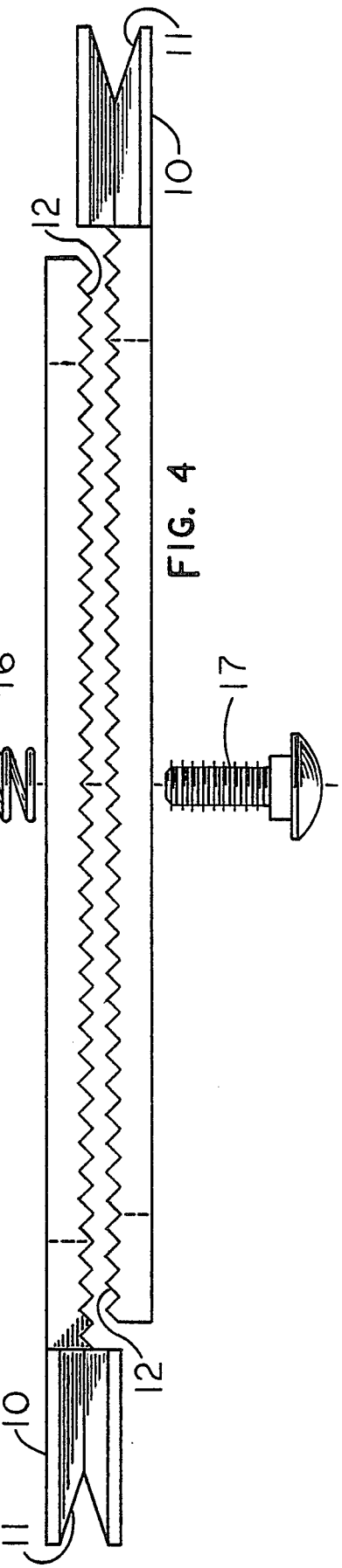

CHAIN-KEEPER

This invention relates to a single function device, which is adjustable in length, and is used to carry and store chain saw cutting chains.

BACKGROUND OF THE INVENTION

During the use of chain saws, the cutting edges of the cutting chains rapidly become dull. This is caused by many factors; some of which are:
 (1) cutting of some hardwoods
 (2) cutting chains coming in contact with the ground
 (3) foreign material in the wood (nails, fencing, etc.)
 (4) extended use Because of these factors, many chain saw operators find it necessary to have multiple cutting chains on hand in the field, allowing them to replace a cutting chain when its' cutting edges become dull. By the very design of these cutting chains, they are extremely difficult to carry or store. In many instances, a single cutting chain may become tangled and jammed, preventing use, until it is straightened. Depending on the extent of entanglement, a person experienced with chain saw operation may spend up to an hour straightening a cutting chain before it may be put into service. Another problem the lack of a suitable carrying/storage device for chain saw cutting chains presents is; during unprotected transportation, the cutting chain cutting edges may become dull by coming in contact with other objects before it is ever put into service.

There is no known device available to carry, store, or maintain chain saw cutting chains in sharp, orderly, untangled fashion.

THE PRESENT INVENTION

In view of the above, it is the object of the present invention to provide a single function carrying/storage device, which is adjustable in length, to allow use for a variety of sizes of chain saw cutting chains, insuring their readiness of use by maintaining them in sharp, orderly, untangled fashion.

In accordance with the present invention there is provided an adjustable device, comprised of (2) two identical components, which can be secured at any point throughout its' adjustment length by a separate mechanism. This separate mechanism causes the (2) two identical components to interlock, maintaining a fixed position, allowing various sizes of chain saw cutting chains to be stored, ready for use. At the end of each of the (2) two identical components is a rounded, grooved fixture. When the components are assembled and form the completed device, the above mentioned grooved fixtures become this receptacles in which the chain saw cutting chain is retained.

In the drawings, in which one of several possible embodiments of the invention is illustrated, corresponding reference characters refer to corresponding parts and in which:

FIG. 1 is a top elevation view of one of the two identical components of this invention;

FIG. 2 is a front elevation view thereof;

FIG. 3 is an end elevation view thereof;

FIG. 4 is an exploded view of the two identical components, with members of the separate securing mechanism, in alignment for assembly and use.

Referring to the drawings of the current invention more particularly by reference character, character 10 refers to a rounded, grooved fixture, which acts as a retaining receptacle for the chain saw cutting chain. The above mentioned fixture 10 is an integral part of 12, which is a serrated, or toothed, bar, of adequate dimension to be adjustable in length, when used with an identical component, to be used as a carrying/storage device for a variety of sizes of chain saw cutting chains.

Slot 13 extends along the majority of the length of bar 12, and acts as a passage for the separate securing mechanism. In the embodiment shown in the drawings, the above mentioned securing mechanism is comprised of a wing nut 14, flat washer 15, coil spring 16 and carriage bolt 17.

To assemble the invention for use, the two identical components are placed in a manner which allows their serrations to mesh. Carriage bolt 17 is inserted, and passes through slot 13. Spring 16 is installed on the threaded shank of carriage bolt 17, as is flat washer 15. With this completed, wing nut 14 is then threaded onto carriage bolt 17. The invention is now assembled for use.

In use, the assembled invention is grasped by bar 12 of both identical components and held with the length of the invention oriented vertically. A portion of a chain saw cutting chain is placed into the upper rounded, grooved fixture. Wing nut 14 is loosened on carriage bolt 17, releasing flat washer 15 and allowing spring 16 to decompress to the point that the interlocking action of serrations on bar 12 may be defeated; however not loosened to the point that tension from coil spring 16 no longer causes the serrations to mesh. At this time, the lower rounded, grooved fixture 10 is forced downward, causing the lowest portion of the chain saw cutting chain to become retained in the lower rounded, grooved fixture. With this operation completed, wing nut 14 is tightened to the point that flat washer 15 completely compresses spring 16. The chain saw cutting chain is now secure, ready to carry or store.

In order to remove the chain saw cutting chain from the invention, the above procedure is reversed.

In view of the above, it will be seen that the several objects of the invention are achieved amd other advantageous results attained. As various changes could be made in the above structures without departing from the scope of the invention, it is understood that all matters contained in the above description shall be interpreted as illustrative and not in a limiting sense.

What is claimed is:

1. An adjustable device for carrying and storing various sizes of chain saw cutting chains in orderly untangled fashion, ready for use, comprising two identical components, each of the two identical components comprising a bar to having opposite ends and a plurality of serrations on a longitudinal face thereof, said serrations facilitating a face to face interlocking relationship between the two identical components at any point throughout the length of the bar, said components further comprising at one end of said bar an arcuate portion having a groove around the circumference thereof and configured in such a way so that a portion of a chain saw cutting chain may be inserted, said adjustable device further comprising a separate locking mechanism in operational contact with each of said components so as to interlock the serrations of said two components and maintain said components in a fixed position, said arcuate portions of each component being located at opposing ends of the locked together components, wherein said chain saw cutting chain is retained in said grooves of said arcuate portions when said components are locked together by said locking mechanism.

2. The device of claim 1 wherein the separate locking mechanism comprises means for releasing to a point where resistance of the interlocking serrations on the bar of the two identical components may be overcome, said locking mechanism further comprising spring tension means which maintains said interlocking action of the identical components while allowing adjustments in length to be made to facilitate retaining the chain saw cutting chain on the device until the two identical components may be secured to a fixed position by the separate locking mechanism.

3. The device of claim 1 wherein the groove of the arcuate is of sufficient depth to contain the cutting edges of chain saw cutting chains, protecting the cutting edges from coming in contact with other objects, maintaining the cutting edges in a sharpened condition.

* * * * *